United States Patent [19]

Mannen

[11] Patent Number: 5,223,946
[45] Date of Patent: Jun. 29, 1993

[54] APPARATUS USING COMPARATOR TO DETECT DROP-OUT OF RECORDED VIDEO SIGNAL

[75] Inventor: Yasunaga Mannen, Kanagawa, Japan

[73] Assignee: Sony Corporation, Tokyo, Japan

[21] Appl. No.: 783,865

[22] Filed: Oct. 29, 1991

[30] Foreign Application Priority Data

Nov. 27, 1990 [JP] Japan .................................. 2-323950

[51] Int. Cl.⁵ .................................................. H04N 5/94
[52] U.S. Cl. .................................... 358/336; 358/314; 360/38.1
[58] Field of Search ............... 358/336, 314, 335, 310, 358/340, 167, 166, 36, 37; 360/38.1

[56] References Cited

U.S. PATENT DOCUMENTS

| | | | |
|---|---|---|---|
| 4,032,966 | 6/1977 | Kenney et al. | 358/36 |
| 4,245,262 | 1/1981 | Ohtsu | 358/36 |
| 4,438,467 | 3/1984 | Schaller et al. | 360/38.1 |
| 4,847,709 | 7/1989 | Uehara et al. | 358/336 |
| 4,893,192 | 1/1989 | Takemura | 358/336 |
| 4,977,461 | 12/1990 | Ichimura | 358/336 |
| 5,032,915 | 7/1991 | Ichimura | 358/336 |
| 5,050,002 | 9/1991 | Suzuki et al. | 358/336 |

Primary Examiner—Tommy Chin
Assistant Examiner—Thai Tran
Attorney, Agent, or Firm—Lewis H. Eslinger; Jay H. Maioli

[57] ABSTRACT

A drop-out detecting apparatus comprises an amplitude detecting circuit supplied with a high frequency video signal reproduced from a record medium, a first smoothing circuit supplied with a detected output of the amplitude detecting circuit and having a short time constant so that it produces an output having a drop-out, a second smoothing circuit supplied with the detected output of the amplitude detecting circuit and having a long time constant so that it produces an output having no drop-out, a detecting circuit for level-comparing a smoothed output of the second smoothing circuit and a first reference level to produce an output of large or small level, and a comparing circuit for level-comparing a smoothed output of the first smoothing circuit and a second reference level provided by attenuating the detected output of the detecting circuit by a predetermined attenuating ratio, wherein the comparing circuit derives a drop-out detecting signal.

12 Claims, 3 Drawing Sheets

APPARATUS USING COMPARATOR TO DETECT DROP-OUT OF RECORDED VIDEO SIGNAL

BACKGROUND OF THE INVENTION

1. Field of the Invention

The present invention generally relates to drop-out detecting apparatus and, more particularly, is directed to a drop-out detecting apparatus which can accurately detect a drop-out from a high frequency video signal reproduced from a record medium even when the level of the high frequency video signal is fluctuated or even when the level thereof is extremely small.

2. Description of the Prior Art

In the most simplified drop-out detecting apparatus for detecting a drop-out from a high frequency video signal (frequency-modulated video signal) played back from a magnetic tape by a rotary magnetic head in a video tape recorder (VTR), the reproduced high frequency video signal is envelope-detected and the resultant envelope signal is compared with a constant reference level, whereby the portion of the compared signal less than the reference level is generated as a drop-out detecting signal.

The above conventional drop-out detecting apparatus has a drawback such that, if the reference level is not changed in accordance with the change of the level of the reproduced high frequency video signal, then it cannot detect the drop-out accurately.

In order to remedy the above-mentioned drawback, another conventional drop-out detecting apparatus is proposed, in which the reproduced high frequency video signal whose gain is automatically controlled is envelope-detected, the resultant envelope signal is compared with the constant reference level and the portion of the compared signal less than the reference level is generated as the drop-out detecting signal.

The above conventional drop-out detecting apparatus becomes complicated in arrangement because it needs an automatic gain control (AGC) circuit and also has the drawback such that it cannot detect a drop-out if the level of the high frequency video signal is fluctuated during the time when the rotary magnetic head comes in contact with the magnetic tape.

Other drop-out detecting apparatus is further proposed to remedy the above shortcoming. According to this previously-proposed drop-out detecting apparatus, as shown in FIG. 1, the reproduced high frequency video signal is envelope-detected and the resultant envelope signal is attenuated by a predetermined attenuation ratio of, for example, $-16$ dB or $-20$ dB, thereby produced as a reference level. Then, the envelope signal is level-compared with the reference level and the portion of the signal lower than the reference level is generated as a drop-out detecting signal.

According to the above drop-out detecting apparatus in which the reproduced high frequency video signal is envelope-detected, the resultant envelope signal is attenuated by the predetermined attenuation ratio so as to be generated as the reference level, the envelope signal is compared with the reference level and the portion of the signal lower than the reference level is produced as the drop-out detecting signal, the drop-out can be accurately detected because the reference level changes in proportion to the level of the envelope signal of the reproduced high frequency video signal. The above drop-out detecting apparatus, however, cannot produce the drop-out detecting signal if a signal-to-noise (S/N) ratio of an FM-demodulated output of the high frequency video signal is deteriorated in the signal portion, the level of which is made extremely small, such as when the rotary magnetic head scans a guard band area of a slant track formed on a magnetic tape if the level of the high frequency video signal, i.e., envelope signal is changed comparatively gently and is considerably fluctuated as in the still playback mode as shown in FIG. 2.

OBJECTS AND SUMMARY OF THE INVENTION

Accordingly, it is an object of the present invention to provide an improved drop-out detecting apparatus in which the aforementioned shortcomings and disadvantages encountered with the prior art can be eliminated.

More specifically, it is an object of the present invention to provide a drop-out detecting apparatus which can accurately detect a drop-out regardless of the fluctuation of the level of a high frequency video signal reproduced from a record medium or even if the level of such high frequency video signal is extremely small.

As an aspect of the present invention, a drop-out detecting apparatus comprises an amplitude detecting circuit supplied with a high frequency video signal reproduced from a record medium, a first smoothing circuit supplied with a detected output of the amplitude detecting circuit and having a short time constant so that it produces an output having a drop-out, a second smoothing circuit supplied with the detected output of the amplitude detecting circuit and having a long time constant so that it produces an output having no drop-out, a detecting circuit for level-comparing a smoothed output of the second smoothing circuit and a first reference level to produce an output of large or small level, and a comparing circuit for level-comparing a smoothed output of the first smoothing circuit and a second reference level attenuated by a predetermined attenuating ratio of the detected output of the detecting circuit, wherein the comparing circuit derives a drop-out detecting signal.

The above and other objects, features and advantages of the present invention will become apparent from the following detailed description of an illustrative embodiment thereof to be read in conjunction with the accompanying drawings.

DETAILED DESCRIPTION OF THE PREFERRED EMBODIMENT

An embodiment of the drop-out detecting apparatus according to the present invention will now be described in detail with reference to FIG. 3.

Figure 1:
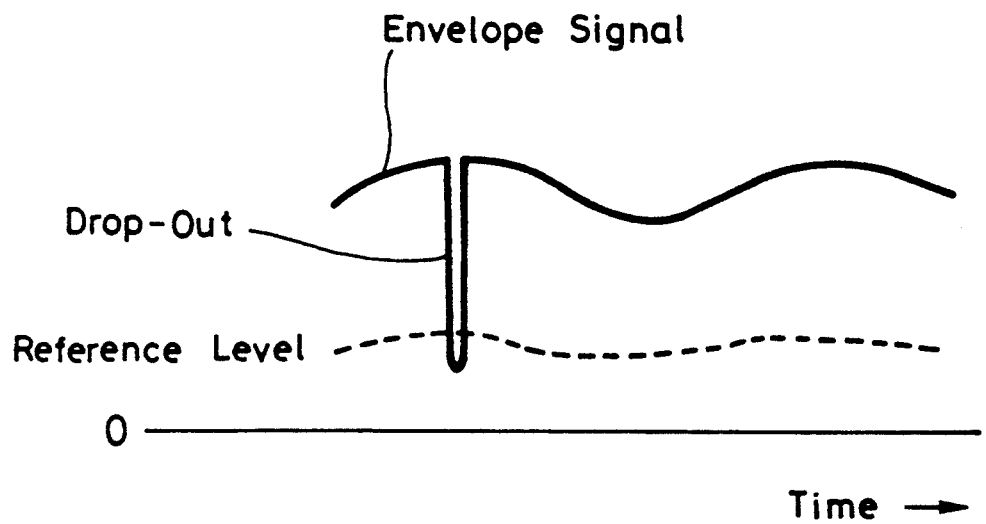
FIGS. 1 and 2 are respectively timing charts used to explain examples of conventional drop-out detecting apparatus.
Figure 2:
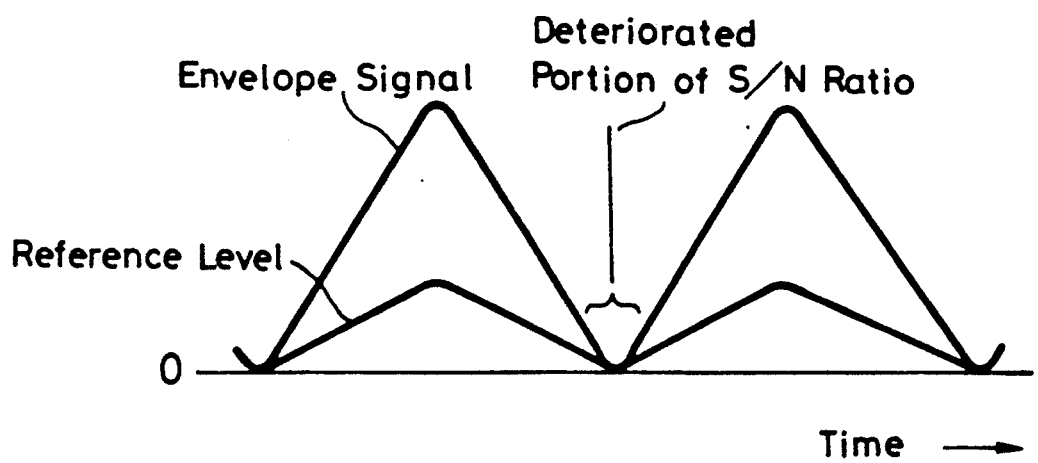
Figure 3:
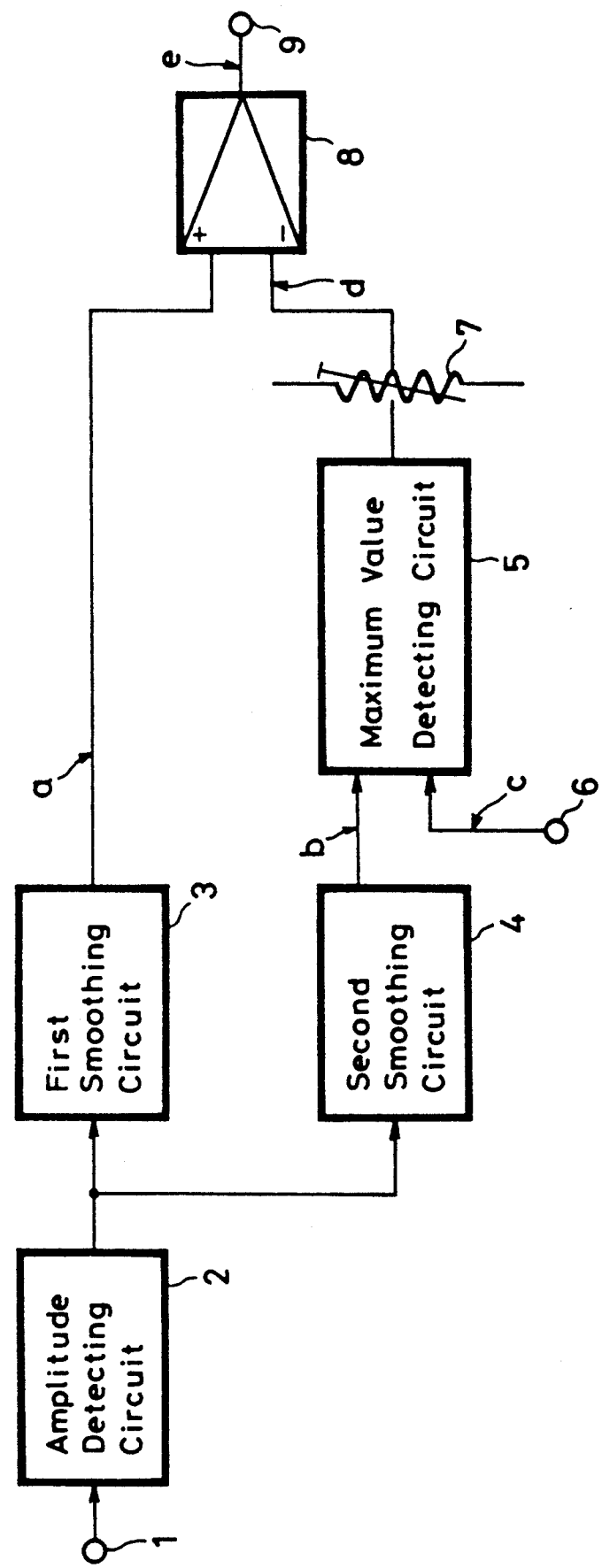
FIG. 3 shows a block diagram of an embodiment of a drop-out detecting apparatus according to the present invention.

Referring to FIG. 3, an input terminal 1 is supplied with a high frequency video signal (frequency-modulated video signal) which is reproduced from a slant track of a magnetic tape by a rotary magnetic head, though not shown. The high frequency video signal applied to the input terminal 1 is supplied to and envelop-detected by an amplitude detecting circuit (envelope-detecting circuit in this embodiment) 2, and an envelope signal from the envelope-detecting circuit 2 is supplied to first and second smoothing circuits 3 and 4.

The first smoothing circuit 3 has a short time constant so that, if a drop-out occurs in the high frequency video signal, then it produces an output having a drop-out.

The second smoothing circuit 4 has a long time constant so that, even if a drop-out occurs in the high frequency video signal, then it produces an output having no drop-out.

Figure 4:
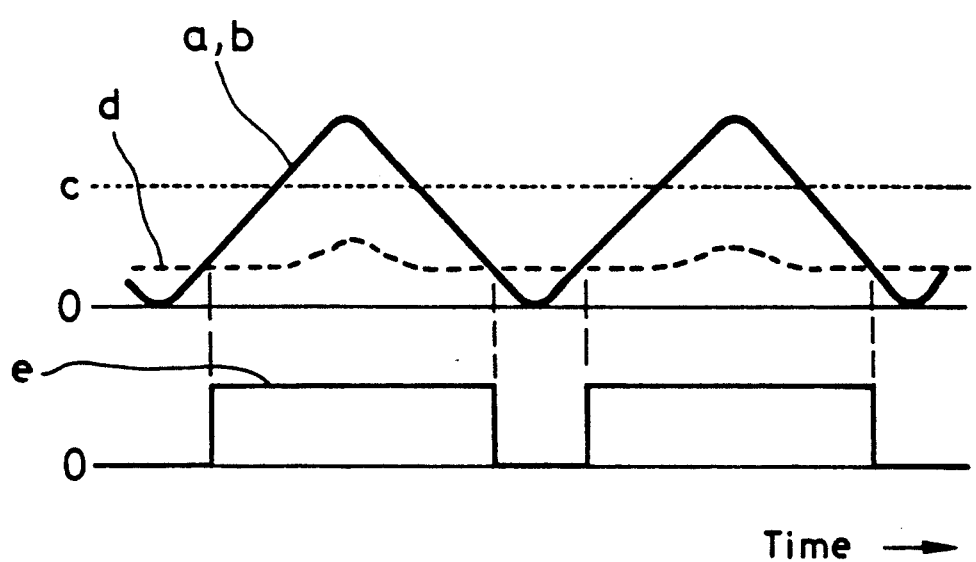
FIG. 4 is a timing chart use to explain operation of the embodiment of the present invention.

A smoothed output b (see FIG. 4) of the second smoothing circuit 4 is supplied to a maximum value detecting circuit (analog OR circuit) 5. The maximum value detecting circuit 5 compares the smoothed output b of the second smoothing circuit 4, i.e., the input signal b with a constant reference level c (see FIG. 4) to produce an output of larger level. Alternatively, the envelope signal from the amplitude detecting circuit 2 may be smoothed by a smoothing circuit, the time constant of which is sufficiently longer than those of the smoothing circuits 3, 4 and a smoothed output therefrom may be employed as the reference level c.

While the input signal b and the reference level c are both positive as described above, if the input signal b and the reference level c are both negative, then the maximum value detecting circuit 5 will be replaced with a minimum value detecting circuit. Further, if the input signal b and the reference level c are positive and negative, then the maximum value detecting circuit and the minimum value detecting circuit may both be employed.

A detected output from the maximum value detecting circuit 5 is supplied to a variable attenuator (variable attenuator or half-fixed attenuator) 7, in which it is attenuated by a predetermined attenuation ratio (e.g., −16 dB, −20 dB, etc.).

The smoothed output of the smoothing circuit 3, that is, the input signal a and the output, which results from attenuating the detected output of the maximum value detecting circuit 5 by the attenuator 7, that is, a reference level d (see FIG. 4) are supplied to a level comparing circuit (e.g., operational amplifier, a differential amplifier, etc.) 8, in which they are level-compared. Then, the level comparing circuit 8 produces a drop-out detecting signal e (see FIG. 4) when the level of the input signal a is lower than the reference level d.

If the input signal a and the reference level d are both negative and when the level of the input signal a is higher than the reference level d, then the level comparing circuit 8 may produce the drop-out detecting signal.

Further, although hysteresis circuits may be provided in the maximum value detecting circuit 5 and the level comparing circuit 8, they are not shown in FIG. 3 and will not be described herein for simplicity.

According to the above-mentioned drop-out detecting apparatus, the reference level d level-compared with the smoothed output a by the level comparing circuit 8 becomes proportional to the envelope signal if the level of the reproduced high frequency video signal applied to the input terminal 1 is high. Whereas, the reference level d becomes the reference level c in the portion where the level of the high frequency video signal, i.e., the envelope signal is extremely small such as when the rotary magnetic head scans the guard band area of the slant track formed on the magnetic tape if the above level is changed comparatively gently and is fluctuated considerably.

Accordingly, even if the level of the high frequency video signal reproduced from the record medium is fluctuated or even if the level of the high frequency video signal is extremely small, then the drop-out can be detected accurately. When the drop-out detecting signal is obtained, the FM-demodulated output of the high frequency video signal, that is, the video signal is substituted with, for example, the one horizontal period-preceding signal portion, the S/N ratio of which is excellent.

According to the present invention as described above, the drop-out detecting circuit comprises the amplitude detecting circuit supplied with the high frequency video signal reproduced from the record medium, the first smoothing circuit supplied with the detected output of the amplitude detecting circuit and whose time constant is short so that it produces the output having the drop-out, the second smoothing circuit supplied with the detected output of the amplitude detecting circuit and whose time constant is long so that it produces the output having no drop-out, the detecting circuit for level-comparing the smoothed output of the second smoothing circuit and the first reference level to produce the output of larger or smaller level and the comparing circuit for level-comparing the smoothed output of the first smoothing circuit and the second reference level provided by attenuating the detected output of the detecting circuit by the predetermined attenuating ratio, wherein the drop-out detecting signal is produced from the comparing circuit so that, even if the level of the high frequency video signal reproduced from the record medium is fluctuated or even if the above level is extremely small, the drop-out can be detected accurately.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. Apparatus for detecting a drop-out of a recorded video signal, said apparatus comprising:
   an amplitude detecting circuit supplied with a high frequency video signal reproduced from a record medium;
   a first smoothing circuit supplied with a detected output of said amplitude detecting circuit and having a short time constant so that it produces an output having a drop-out;
   a second smoothing circuit supplied with the detecting output of said amplitude detecting circuit and having a long time constant so that it produces an output having no drop-out;
   a detecting circuit for level-comparing a smoothed output of said second smoothing circuit and a first reference level to produce an output of large or small level; and
   a comparing circuit for level-comparing a smoothed output of said first smoothing circuit and a second reference level provided by attenuating the detected output of said detecting circuit by a predetermined attenuating ratio, wherein said comparing circuit derives a drop-out detecting signal.

2. A drop-out detecting apparatus according to claim 1, wherein said high frequency video signal is reproduced from a slant track of a magnetic head by a rotary magnetic head.

3. A drop-out detecting apparatus according to claim 1, wherein said amplitude detecting circuit is an envelope detecting circuit.

4. A drop-out detecting apparatus according to claim 1, wherein said detecting circuit is a maximum value detecting circuit if an input signal and a reference level are both positive.

5. A drop-out detecting apparatus according to claim 4, wherein said detecting circuit is a minimum value detecting circuit if said input signal and said reference level are both negative.

6. A drop-out detecting apparatus according to claim 4, wherein said detecting circuit is said maximum and minimum value detecting circuits if said input signal and said reference level are both positive and negative.

7. A drop-out detecting apparatus according to claim 1, wherein said second reference level is provided by attenuating the output of said detecting circuit through a variable attenuator.

8. A drop-out detecting apparatus according to claim 7, wherein said variable attenuator is a half-fixed attenuator.

9. A drop-out detecting apparatus according to claim 1, wherein said predetermined attenuation ratio is $-16$ dB or $-20$ dB.

10. A drop-out detecting apparatus according to claim 1, wherein said comparing circuit is formed of an operational amplifier.

11. A drop-out detecting apparatus according to claim 1, wherein said comparing circuit is formed of a differential amplifier.

12. A drop-out detecting apparatus according to claim 1, wherein said comparing circuit derives said drop-out detecting signal when the level of said input signal is lower than said reference level.

* * * * *